United States Patent [19]

Wilkinson

[11] 4,337,625
[45] Jul. 6, 1982

[54] WASTE HEAT DRIVEN ABSORPTION REFRIGERATION PROCESS AND SYSTEM

[75] Inventor: William H. Wilkinson, Columbus, Ohio

[73] Assignee: Battelle Development Corp., Columbus, Ohio

[21] Appl. No.: 239,256

[22] Filed: Mar. 2, 1981

[51] Int. Cl.³ .......................... F25B 7/00; F25B 15/00; F25B 27/02

[52] U.S. Cl. .......................................... 62/79; 62/101; 62/148; 62/238.3; 62/476

[58] Field of Search .................... 62/79, 101, 102, 114, 62/238.3, 476, 501, 148; 165/1, 16, 43, 58

[56] References Cited

U.S. PATENT DOCUMENTS

| | | |
|---|---|---|
| 2,043,548 | 6/1936 | Maiuri . |
| 2,182,098 | 12/1939 | Sellew ........................................ 62/79 |
| 2,182,453 | 12/1939 | Sellew ........................................ 62/79 |
| 2,351,115 | 5/1944 | Katzow . |
| 2,640,331 | 6/1953 | Backstrom . |
| 3,126,720 | 3/1964 | Stubblefield . |
| 3,483,710 | 12/1969 | Bearint . |
| 4,094,355 | 6/1978 | Blytas ................................ 62/101 X |
| 4,102,388 | 7/1978 | Blytax ................................ 62/101 X |
| 4,164,128 | 8/1979 | Newton ............................ 62/148 X |
| 4,167,101 | 9/1979 | Rojey .................................... 62/102 |
| 4,266,404 | 5/1981 | ElDifrawi ............................. 62/79 |

OTHER PUBLICATIONS

Maiuri, "Modern Absorption Machines for Industrial Refrigeration", Refrigerating Engineering, Sep. 1936, pp. 159-162 and 182.

*Primary Examiner*—Lloyd L. King
*Attorney, Agent, or Firm*—Biebel, French & Nauman

[57] ABSTRACT

Absorption cycle refrigeration processes and systems are provided which are driven by the sensible waste heat available from industrial processes and other sources. Systems are disclosed which provide a chilled water output which can be used for comfort conditioning or the like which utilize heat from sensible waste heat sources at temperatures of less than 170° F. Countercurrent flow equipment is also provided to increase the efficiency of the systems and increase the utilization of available heat.

25 Claims, 8 Drawing Figures

WASTE HEAT DRIVEN ABSORPTION REFRIGERATION PROCESS AND SYSTEM

The Government of the United States of America has rights in this invention pursuant to Contract No. W 7405-eng-26 awarded by the U.S. Department of Energy.

BACKGROUND OF THE INVENTION

This invention relates to absorption refrigeration systems; and more particularly to absorption refrigeration systems driven by relatively low temperature sensible waste heat sources.

Absorption refrigeration systems are heat operated cycles in which a secondary fluid, termed the absorbent, is employed to absorb the primary fluid, termed refrigerant, which has been vaporized in an evaporator. The combination of the absorbent and refrigerant is termed the working solution. Such systems are thermally motivated, with a source of heat energy being supplied to one thermodynamic cycle (heat engine) at a useful temperature so that, in rejecting a portion of that heat energy to an ambient sink, work in the form of a vapor pressure difference in the refrigerant is generated. This vapor pressure difference is the work input to a second thermodynamic cycle (Rankine cycle) that transfers heat from an external source to the cold evaporator producing the refrigerating effect. Except for a small direct mechanical input to solution and circulating pumps, all energy to drive the system is derived from the heat energy source.

Simple absorption cycle refrigeration systems are able to operate with a coefficient of performance (COP) of about 0.7, where $$COP = [T_l(T_h - T_s)]/[T_h(T_s - T_l)]$$

and $T_l$ is the temperature of the refrigeration load, $T_h$ is the temperature of the heat source, and $T_s$ is the temperature of the ambient heat sink, all in degrees Rankine. However, recent rises in fuel costs have led to the need for the use of multiple effect cycles in absorption refrigeration systems which increase the energy efficiency of such systems and raise the COP of such systems to values above 1.0. In such multiple effect cycles, two or more generators (desorbers) are employed, one being driven by high quality heat from an external source with the other generator or generators being driven by the heat of condensation of the refrigerant vapor from the first generator. Condensate from these generators is conveyed to the evaporator. The coefficient of performance is increased by about 50% for each multiple-effect cycle.

In order to lower fuel costs, not only is there a need for improved energy efficiency, but it is also desirable to improve energy utilization of heretofore wasted sources of low grade heat. These sources include heat provided as a by-products of a chemical reaction or available as heat losses from boilers, drying equipment, chemical reactors, or the like. It has been suggested that such heretofore waste heat be used instead of higher grade energy sources to provide the energy requirements for absorption refrigeration cycle comfort conditioning for commercial and industrial facilities.

However, much of the available waste heat from the above-mentioned sources is at a temperature too low to be readily usable in absorption cooling systems. For example, a simple absorption cycle system provides no cooling from heat sources having a temperature of 170° F. or below. But, many industrial process waste heat streams are available at 130°–150° F.

Accordingly, the need exists for an absorption refrigeration cycle system which can utilize the low grade sensible heat available from industrial process streams either for comfort conditioning, self-cooling of such process streams, or other uses.

SUMMARY OF THE INVENTION

The present invention provides a number of novel absorption cycle refrigeration systems which operate utilizing heretofore wasted heat from industrial processes. Importantly, the refrigeration systems of the present invention can provide cooling effects from sensible waste heat streams having temperatures of 170° F. or below although the systems also are operable using heat from higher temperature sources when such sources are available. The present invention also utilizes countercurrent flow equipment having increased contact areas and residence times for improved mass and heat transfer characteristics to improve the performance of the systems.

In one embodiment of the invention, a compound absorption cycle is utilized having two working solution loops so that the desorber in each loop can be operated at a different temperature. In this manner, the waste heat stream is fed sequentially to the desorbers so that a greater portion of the available sensible heat from the waste heat stream is utilized.

In operation, relatively low pressure (in relation to the other system components) refrigerant vapor from the evaporator is sent to a first absorber operating at the same pressure. There, at least a portion of the vapor is absorbed into a working solution which is initially lean in refrigerant. The working solution is then pumped to a first desorber operating at an intermediate pressure where heat from an available waste heat stream is used to cause at least a portion of the refrigerant to desorb from solution as vapor. The working solution is returned to the first absorber to complete the first solution loop while the refrigerant vapor passes into a second absorber operating at the same pressure as the first desorber.

In the second absorber, at least a portion of the refrigerant vapor is absorbed into a working solution initially lean in refrigerant and is pumped to a second desorber operating at a relatively high pressure in relation to the other system components. In the second desorber, heat from an available waste heat source causes at least a portion of the refrigerant in the working solution to desorb as vapor. The remaining working solution is returned to the second absorber to complete the second working solution loop while the refrigerant vapor desorbed from solution passes to a condenser operating at the same pressure. The condensed liquid refrigerant is then passed through an expansion valve into the evaporator where it vaporizes and draws heat from from an external space producing the refrigerating effect.

Depending on the temperature of the available waste heat source, the temperature of the ambient sink, and the temperature difference between the two, the system of the present invention can be arranged so that waste heat is supplied in sequence to the high pressure desorber and then the intermediate pressure desorber, the intermediate pressure desorber and then the high pressure desorber, or the waste stream can be split and supplied at the same temperature to both desorbers. Alternatively, if two or more waste heat streams are available at different temperatures, the streams can be suplied to different desorbers as needed. Because of the flexibility of the system, the overall efficiency of energy utilization which is available as waste heat can be greatly improved over prior systems. Moreover, in situations where the temperature differential between the available waste heat stream and ambient sink is small, one or more additional working solution loops can be incorporated into the system to maximize the utilization of the available energy by operating the desorber in each loop at a different temperature than the other desorbers.

In another embodiment of the invention, a parallel flow double effect cycle utilizes waste heat to produce a refrigerating effect. Refrigerant vapor at a relatively low pressure from a first evaporator passes to a first absorber operating at the same pressure. There, at least a portion of the refrigerant vapor is absorbed into a working solution which is initially lean in refrigerant.

The low pressure absorber is in heat exchange communication with a second intermediate pressure evaporator, and the heats of condensation and solution produced by the absorption of refrigerant vapor into solution are used to evaporate refrigerant in the second evaporator. Vapor from the second evaporator passes to a second absorber operating at the same intermediate pressure where at least a portion of that vapor is absorbed into solution.

Working solutions from the first and second absorbers are then combined and pumped to a desorber operating at a relatively high pressure with respect to other system components. Utilizing the heat supplied from an available waste heat stream, at least a portion of the refrigerant in the working solution is desorbed as vapor. The working solution, now again lean in refrigerant, is returned to the first and second absorbers to complete the solution loop. Vapor from the desorber is then condensed as liquid refrigerant in the condenser. The refrigerant is split into two streams and expanded into the first and second evaporators where it vaporizes and draws heat from an external space producing the refrigerating effect.

In a preferred embodiment of the invention, the absorption cycle refrigeration systems utilize the countercurrent flow devices described in commonly assigned copending application Ser. No. 177,695, filed Aug. 13, 1980. Use of this countercurrent flow equipment significantly enhances the utilization of waste heat from relatively low temperature sensible heat streams by providing increased surface areas and residence times for heat and mass transfer to occur.

Accordingly, it is an object of the present invention to provide absorption refrigeration systems which utilize relatively low temperature sensible waste heat streams from industrial processes to produce, for example, comfort conditioning and self cooling of such process streams. This and other objects and advantages of the invention will become apparent from the following description, the accompanying drawings, and the appended claims.

DESCRIPTION OF THE PREFERRED EMBODIMENTS

Figure 1:
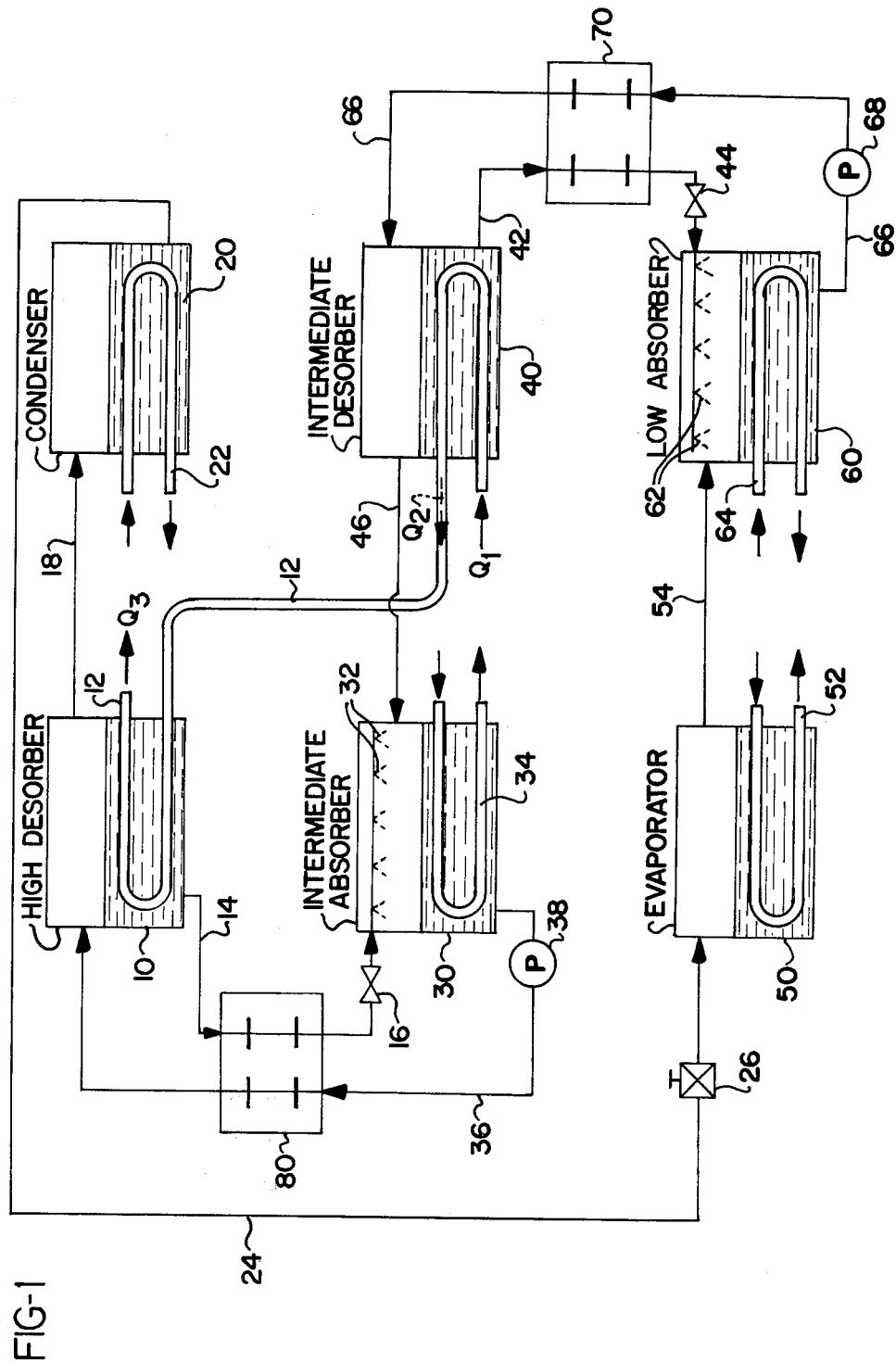
FIG. 1 is a schematic illustration of the basic components of the absorption refrigeration system of the present invention.

Referring to FIG. 1, the basic components of the waste heat driven refrigeration system of the present invention include a desorber 10 and a condenser 20, both operating at a relatively high pressure with respect to the rest of the system components, although in absolute terms, typical operating pressures are less than one atmosphere. The system also includes an absorber 30 and another desorber 40 operating at an intermediate pressure, lower than that of desorber 10 and condenser 20, but higher than that of evaporator 50 and absorber 60, respectively.

As shown, desorber 40 is supplied with heat from a sensible waste heat source. Depending upon the source, waste heat from typical industrial processes may be available at from about 130° F. to well above 200° F. After transferring an increment of its available heat and undergoing a proportionate drop in temperature, the source is then routed through desorber 10 where it gives up a further increment of its available heat. In this manner, a greater proportion of the available waste heat is utilized by the system. Condenser 20 and absorbers 30 and 60 reject heat to an available heat sink at a temperature lower than the initial temperature of the waste heat source. Evaporator 50 draws heat from an external space to be cooled, providing the refrigerating effect.

In operation, a source of waste heat $Q_1$ at a temperature $t_1$ ($t_1 > t_2 > t_3$) is supplied through a heat exchange fluid in conduit 12 to desorber 40 where a portion of the heat is given up to desorb refrigerant as vapor from a working solution of absorbent and refrigerant as the temperature of the heat exchange fluid drops to $t_2$ and heat content $Q_2$.

The waste stream then gives up a further increment of heat in desorber 10 and leaves desorber 10 with a heat $Q_3$ and a temperature $t_3$. In alternative embodiments of the invention, the waste heat may be supplied first to desorber 10 and then to desorber 40 or may be split into two streams and supplied simultaneously to desorbers 10 and 40.

The desorber 10 and condenser 20 are generally maintained under a relatively high pressure with respect to the rest of the system. This pressure is typically about 0.5–1.5 psia for a lithium bromide (absorbent)—water (refrigerant) system. This absorbent-refrigerant pair is preferred over an ammonia-water pair because of the negligible volatility of the lithium bromide which simplifies equipment design. This permits the supply of refrigerant vapor produced in the respective desorbers to subsequent system components at substantially the same temperature and pressure at which it was generated. The use of an ammonia—water pair would require rectification and cooling of vapor leaving the system desorbers.

Refrigerant vapor produced in desorber 10 is then driven, by a slight difference in vapor pressure, through line 18 to condenser 20. In condenser 20, at least a portion of the vapor is condensed by cooling it to the temperature of an available ambient heat sink. This is done by supplying cooling water or other fluid through conduit 22. The condensed refrigerant is then passed via line 24, through expansion valve 26, into evaporator 50.

Evaporator 50 is maintained at a relatively low pressure with respect to condenser 20. For a lithium bromide-water system, the pressure in the evaporator is maintained at about 0.1–0.2 psia and it produces chilled water at from 35°–45° F. As refrigerant is expanded into evaporator 50, it draws heat from a heat exchange fluid such as water in conduit 52 as it vaporizes. The chilled water in conduit 52 can then be utilized as needed for comfort conditioning a workspace, to cool other process streams, or the like.

Refrigerant vapor from evaporator 50 is then passed via line 54 to absorber 60. In absorber 60, the vapor is contacted by a working solution of absorbent and refrigerant, initially lean in refrigerant, which is being recycled from desorber 40 by spraying the solution through nozzles 62. At least a portion of the vapor is absorbed into solution and gives up latent heats of condensation and solution. A fluid in conduit 64 from an available ambient heat sink such as a cooling tower, river, or lake removes the heat generated. The now rich in refrigerant solution is sent, via line 66 and pump 68, through solution heat exchanger 70 to desorber 40.

In desorber 40, heat $Q_1$ at a temperature $t_1$ from the waste heat stream in conduit 12 is supplied to the working solution. The heat causes at least a portion of the refrigerant in solution to desorb as vapor. The fluid in conduit 12 leaves desorber 40 having a remaining heat $Q_2$ and at a temperature $t_2$ and passes into desorber 10. The working solution, now lean in refrigerant, is returned to absorber 60 via line 42, through recuperative heat exchanger 70 and expansion valve 44. In heat exchanger 70, some of the heat from the hot lean solution in line 42 is given up to the rich solution in line 66. The heat exchange minimizes flash vaporization which occurs when the lean solution is throttled through expansion valve 44 to absorber pressure. The heat transferred to the rich solution in line 66 also minimizes the additional heat necessary to raise its temperature to that maintained in the desorber.

Refrigerant vapor formed in desorber 40 is driven by a slight difference in vapor pressure through line 46 to absorber 30. Absorber 30 and desorber 40 are maintained at a pressure intermediate that of desorber 10 and condenser 20 (high) and evaporator 50 and absorber 60 (low). For a lithium bromide-water system, this intermediate pressure is about 0.3 to 0.6 psia. In absorber 30, the vapor is contacted by a different working solution of absorbent and refrigerant, initially lean in refrigerant, which is being recycled from desorber 10 by spraying the solution through nozzles 32. At least a portion of the vapor is absorbed into solution and gives up latent heats of condensation and solution. A fluid in conduit 34 from an available heat sink removes the heat generated. The now rich solution is returned, via line 36 and pump 38, through recuperative solution heat exchanger 80 to desorber 10. Heat exchanger 80 acts in a similar manner to heat exchanger 70, as explained above. Lean solution from desorber 10 passes through line 14, heat exchanger 80, and expansion valve 16 to absorber 30 to complete the working solution loop.

Figure 2:
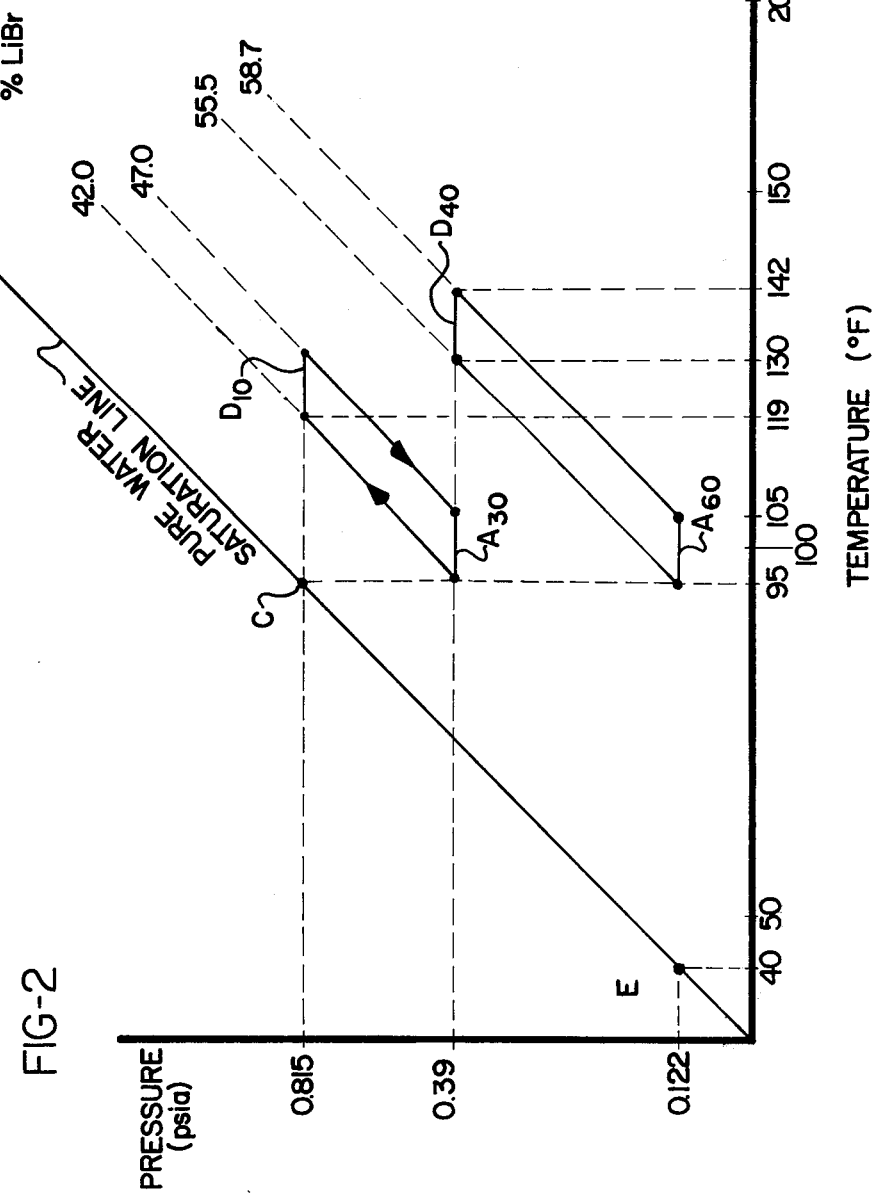
FIG. 2 is a pressure-temperature-concentration diagram of the system illustrated in FIG. 1.

To illustrate the operation of the system of FIG. 1, and with reference to the pressure-temperature-concentration diagram of FIG. 2, heat from a waste heat source entering at 169° F. is utilized by extracting it in two approximately equal temperature drops of 13° F. each to operate desorber 10 (designated $D_{10}$) and desorber 40 ($D_{40}$). This assumes that the desorbers operate as well-mixed pools at log mean temperature differences of about 19° F. and all other heat exchangers are designed for a log mean temperature difference of approximately 10° F. With condenser 20(C) operating at 95° F. and 0.815 psia and evaporator 50(E) generating saturated vapor at 40° F. and 0.122 psia, the saturated refrigerant vapor from evaporator 50 enters absorber 60($A_{60}$) where it is contacted by a working solution of about 58.7% LiBr at 105° F. The rich in refrigerant solution leaves absorber 60 with about a 55.5% concentration of LiBr and at 95° F., having rejected heat to an available ambient sink.

This solution is then pumped through recuperative heat exchanger 70 and enters desorber 40 at about 128° F. Desorber 40 operates at about 0.39 psia, and the heat supplied from the waste heat stream desorbs sufficient vapor so that the lean in refrigerant solution leaves the desorber at about a 58.7% LiBr concentration at 140° F. After passing through heat exchanger 70 and expansion valve 44 the lean solution is cooled so that it enters absorbent 60 at about 105° F.

Absorber 30 ($A_{30}$) receives refrigerant vapor from desorber 40 and contacts it with an initially lean working solution having a concentration of 47.0% LiBr at about 105° F. The rich in refrigerant solution leaves absorber 30 with about a 42.0% LiBr concentration at 95° F. and is pumped through recuperative heat exchanger 80 where it is heated to about 119° F. before entering desorber 10. In desorber 10, waste heat is supplied to the working solution to desorb as vapor a portion of the refrigerant. The desorbed vapor is sent to condenser 20 while the now lean in refrigerant solution leaves desorber 10 via line 14 at a 47.0% LiBr concentration at 130° F. This solution is cooled in heat exchanger 80 to about 105° F. before returning to absorber 30.

The waste heat stream leaving desorber 40 is cooled from about 169° F. to 156° F. while the stream leaving desorber 10 is cooled from about 156° F. to 143° F. Thus, the system of the present invention is able to utilize about 35% of the heat from an available waste heat stream above a 95° F. heat sink to produce a chilled water output at 40° F. The coefficient of performance of the system is about 0.42. A simple absorption refrigeration system, on the other hand, is unable to produce any cooling whatsoever from a 169° F. waste heat stream.

Figure 3:
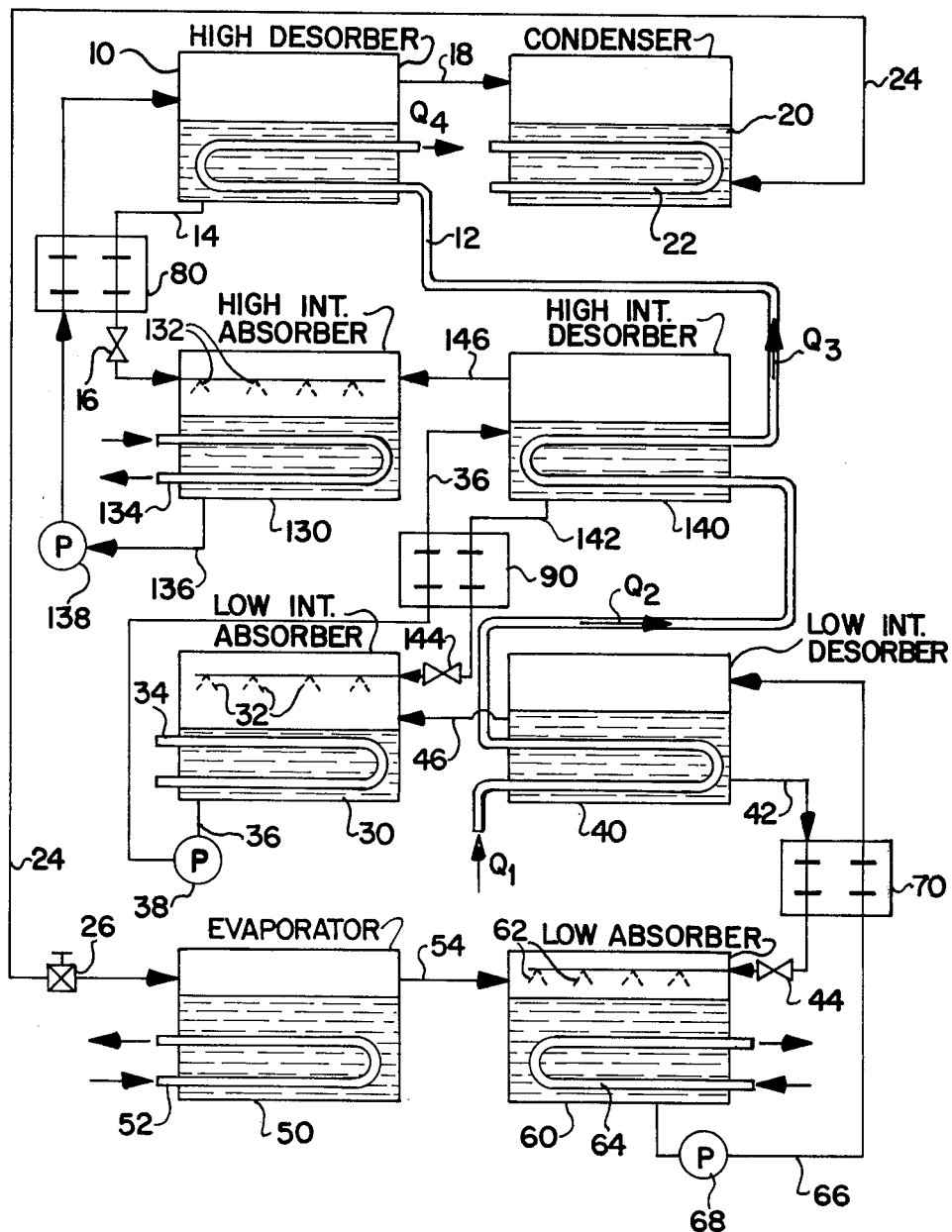
FIG. 3 is a schematic illustration of a modification of the basic absorption refrigeration system of FIG. 1.

In situations where the temperatures of the available waste heat source and the ambient heat sink are relatively close together, the system of FIG. 1 may be modified to include another solution loop so that three progressively weaker solution loops can be utilized to make use of the small available temperature differential. As illustrated in FIG. 3, where like components are represented by like reference numerals, a source of waste heat $Q_1$ is supplied through a heat exchange fluid in conduit 12 to desorber 40 where a portion of the heat is given up to desorb refrigerant from solution as vapor. The remaining waste heat $Q_2$ is then successively passed through desorbers 140 and 10, respectively, where further increments of heat are given up so that the stream leaving desorber 10 has a remaining heat $Q_4$.

Refrigerant vapor produced in desorber 10 is driven, by a slight difference in vapor pressure, through line 18 to condenser 20. In condenser 20, at least a portion of the vapor is condensed by cooling it to the temperature of an available ambient heat sink through fluid in conduit 22. The condensed refrigerant is then sent through line 24 and expansion valve 26 to evaporator 50. As refrigerant is expanded into evaporator 50, it vaporizes causing the fluid in conduit 52 to be cooled by drawing heat from it.

Refrigerant vapor from evaporator 50 is then passed through line 54 to absorber 60. In absorber 60, the vapor is contacted by an initially lean in refrigerant solution sprayed from nozzles 62. At least a portion of the vapor is absorbed into the working solution which is pumped through line 66 by pump 68 through solution heat exchanger 70 to desorber 40. In desorber 40, a further increment of heat from the waste heat source is utilized to cause at least a portion of the refrigerant to desorb as vapor from solution. The working solution, now lean in refrigerant, is returned to absorber 60 via line 42 through heat exchanger 70 and expansion valve 44.

Refrigerant vapor formed in desorber 40 is driven by a slight difference in vapor pressure through line 46 to absorber 30. In absorber 30, the vapor is contacted by an initially lean in refrigerant working solution sprayed through nozzles 32. At least a portion of the vapor is absorbed into solution, giving up its latent heats of condensation and solution. The now rich in refrigerant solution is pumped by pump 38 through line 36 and recuperative heat exchanger 90 to desorber 140. In desorber 140, which is maintained at a pressure intermediate that of desorber 40 and desorber 10, a further increment of heat from the waste heat stream in conduit 12 is supplied to the working solution. This addition of heat causes a portion of the refrigerant in solution to desorb as vapor. The working solution which is now lean in refrigerant is returned to absorber 30 via line 142 through heat exchanger 90 and expansion valve 144.

Refrigerant vapor formed in desorber 140 is then passed through line 146 to absorber 130. In absorber 130, the vapor is contacted by a working solution recycled from desorber 10 through line 14, heat exchange 80, throttle valve 16, and nozzles 132. At least a portion of the vapor is absorbed into solution. That solution is then returned, via line 136 and pump 138, through recuperative heat exchanger 80 to desorber 10 to complete the solution loop.

Figure 4:
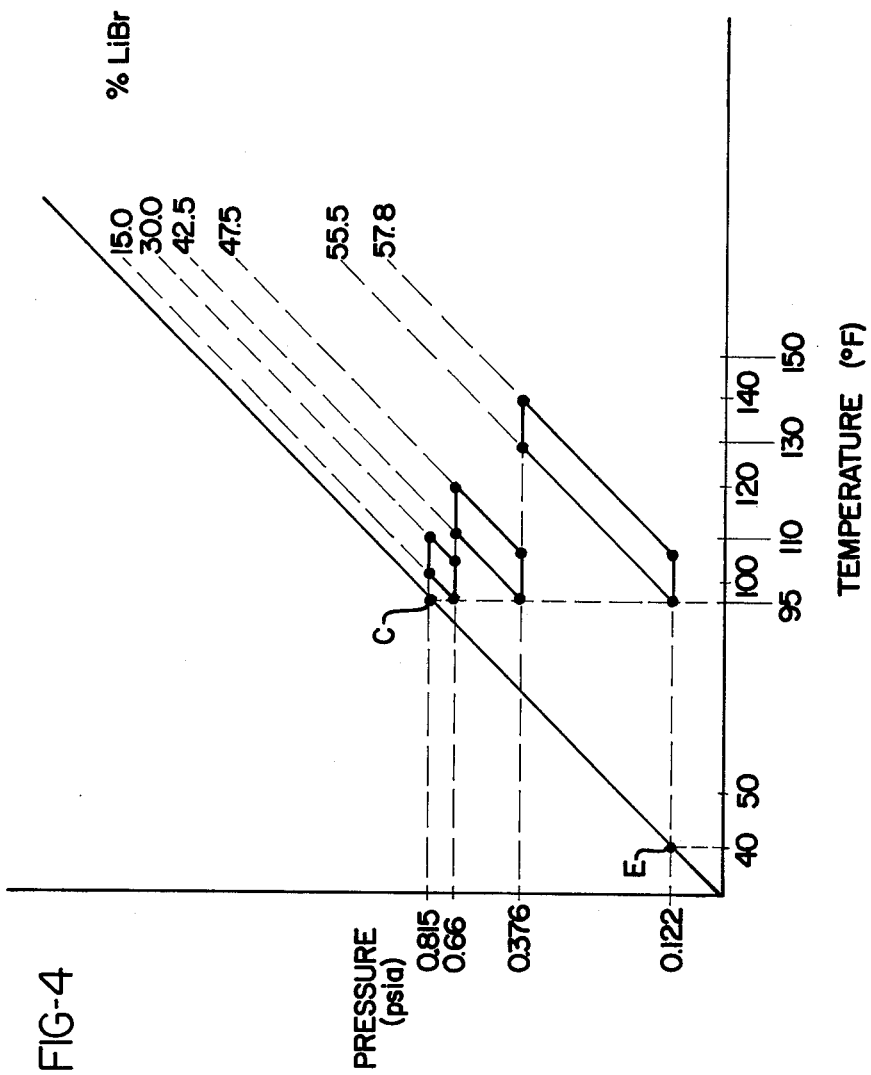
FIG. 4 is a pressure-temperature-concentration diagram of the system illustrated in FIG. 3.

To illustrate the operation of the system of FIG. 3, and with reference to the pressure-temperature-concentration diagram of FIG. 4, heat from a waste heat source entering at 169° F. is utilized by extracting it in three approximately equal temperature drops of 16° F. each to operate desorber 10 ($D_{40}$), desorber 140 ($D_{140}$), and desorber 10 ($D_{10}$). With condenser 20 (C) operating at 95° F. and 0.815 psia and evaporator 50 (E) generating saturated vapor at 40° F. and 0.122 psia, the saturated refrigerant vapor from evaporator 50 enters absorber 60 ($A_{60}$) where it is contacted by a working solution of about 58.7% LiBr at 105° F. The rich in refrigerant solution leaves absorber 60 with about a 55.5% concentration of LiBr at 95° F., having rejected heat to an available ambient sink.

This solution is then pumped through recuperative heat exchanger 70 and enters desorber 40 at about 130° F. Desorber 40 operates at about 0.376 psia, and the heat supplied from the waste heat stream, as it cools from 169° F. to about 158° F., desorbs sufficient vapor so that the lean in refrigerant solution leaves the desorber at about a 57.8% LiBr concentration at 141° F. After passing through heat exchanger 70 and expansion valve 44, the lean solution is cooled so that it reenters absorber 60 at about 105° F.

Absorber 30($A_{30}$) receives refrigerant vapor from desorber 40 and contacts it with an initially lean working solution having a concentration of 47.5% LiBr at 105° F. The rich in refrigerant solution leaves absorber 30 with a 42.5% LiBr concentration at about 95° F. and is pumped through recuperative heat exchanger 90 where it is heated to about 115° F. before entering desorber 140 ($D_{140}$). In desorber 140, a further increment of waste heat is supplied to the working solution to desorb as vapor a portion of the refrigerant cooling the waste heat stream from about 153° F. to 137° F. The desorbed vapor at about is sent to absorber 130 ($A_{130}$) while the lean solution leaves desorber 140 at a 47.5% LiBr concentration at about 0.66 psia and 126° F.

Absorber 130 receives refrigerant vapor from desorber 140 and contacts it with working solution having a 30% LiBr concentration at 105° F. The rich in refrigerant solution leaves absorber 130 with about a 15% LiBr concentration at 95° F. and is pumped through recuperative heat exchanger 80 where it is heated to about 100° F. before entering desorber 10. In desorber 10, the third increment of waste heat is supplied to the working solution to desorb as vapor a portion of the refrigerant, cooling the waste heat stream from about 137° F. to 121° F. The desorbed vapor is sent to condenser 20 while the now lean in refrigerant solution leaves desorber 10 at a 30% LiBr concentration and 110° F. The c.o.p. is reduced to about 0.29 but the waste utilization is almost doubled so that a net increase in cooling effect is available from the given waste heat stream.

Figure 5:
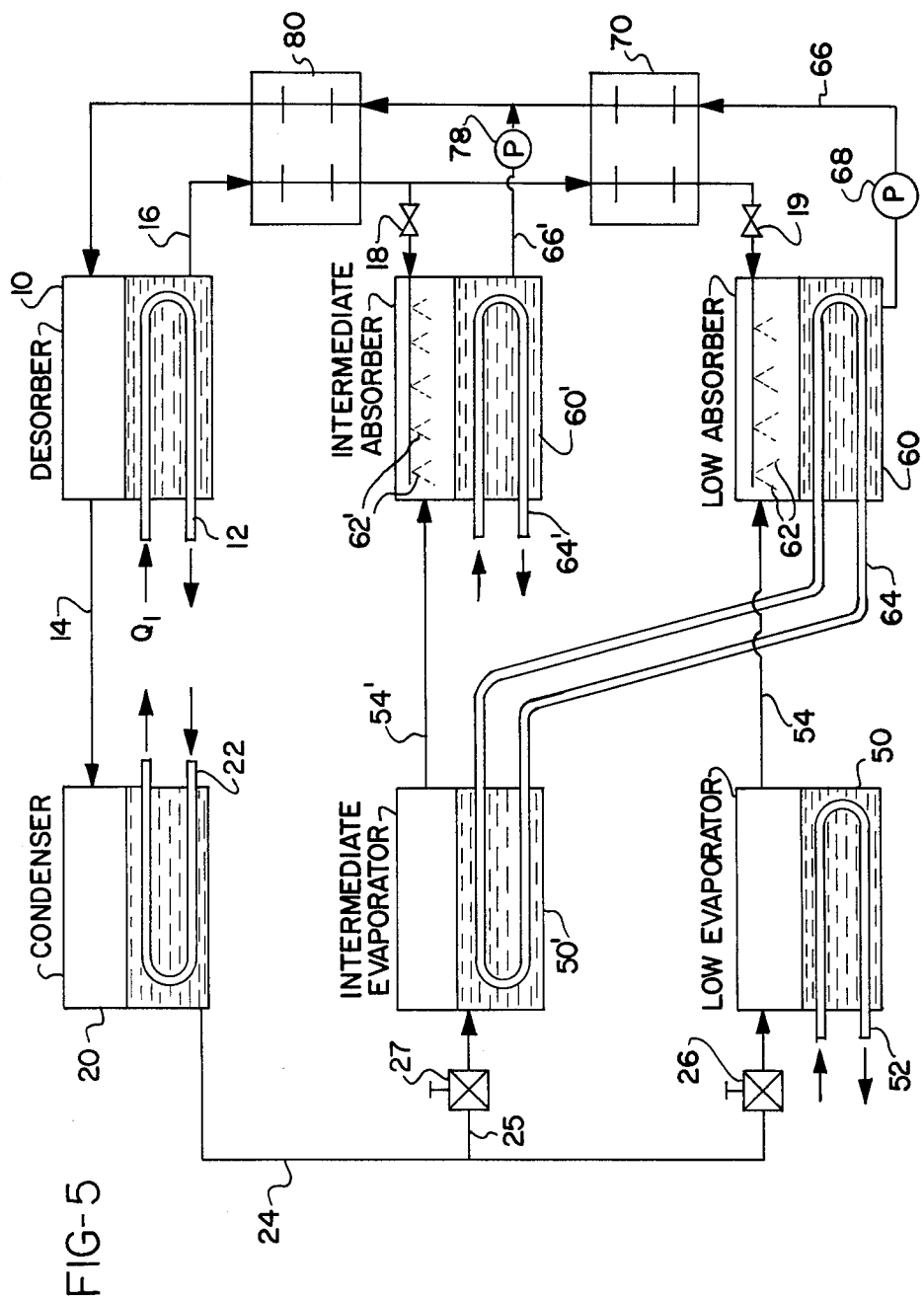
FIG. 5 is a schematic illustration of another embodiment of the absorption refrigeration system of the present invention.

In the embodiment of the invention illustrated in FIG. 5, a double effect parallel solution flow system is utilized to provide a 40° F. chilled water output from a waste heat stream. By using a parallel solution flow arrangement, the desorber and both absorbers operate with essentially the same concentration difference. This permits the desorber to be operated at a lower temperature and thus, allows it to extract more heat from an available sensible waste heat stream. As shown, a source of waste heat $Q_1$ is supplied through a heat exchange fluid in conduit 12 to desorber 10, which is maintained at a relatively high pressure with respect to the rest of the system, where a portion of the heat is given up to desorb refrigerant from solution as vapor. The vapor from desorber 10 is driven, by a slight different in vapor pressure, through line 14 to condenser 20. In condenser 20, at least a portion of the vapor is condensed by cooling it to the temperature of an available ambient heat sink through fluid in conduit 22.

The condensed refrigerant is then sent through lines 24 and 25 and expansion valves 26 and 27 to evaporators 50 and 50'. Evaporator 50' is maintained at a somewhat higher temperature and pressure than evaporator 50. As refrigerant is expanded into evaporator 50, it vaporizes causing the fluid in conduit 52 to be cooled by drawing heat from it. The fluid in conduit 52 can then be used to provide comfort cooling for a workspace or the like.

Refrigerant vapor from evaporator 50 is then passed through line 54 to absorber 60. In absorber 60, the vapor is contacted by an initially lean in refrigerant solution sprayed from nozzles 62. At least a portion of the vapor is absorbed into the working solution which is then pumped through line 66 and recuperative heat exchangers 70 and 80 by pumps 68 and 78 to desorber 10. The heat generated by the absorption of vapor into solution is transferred to the heat exchange fluid in conduit 64. This heat is then used to evaporate refrigerant in evaporator 50'.

The refrigerant vapor from evaporator 50' is then passed through line 54' to absorber 60'. In absorber 60', the vapor is contacted by a working solution of absorbent and refrigerant sprayed from nozzles 62'. At least a portion of the vapor is absorbed into the working solution which is pumped through line 66' by pump 78 where it is combined with the working solution in line 66. The heat generated by the absorption of vapor into solution is rejected to an available ambient heat sink through the heat exchange fluid in conduit 64'. Lean solution from desorber 10 is returned to absorbers 60 and 60' via line 16 and expansion valves 18 and 19.

Figure 6:
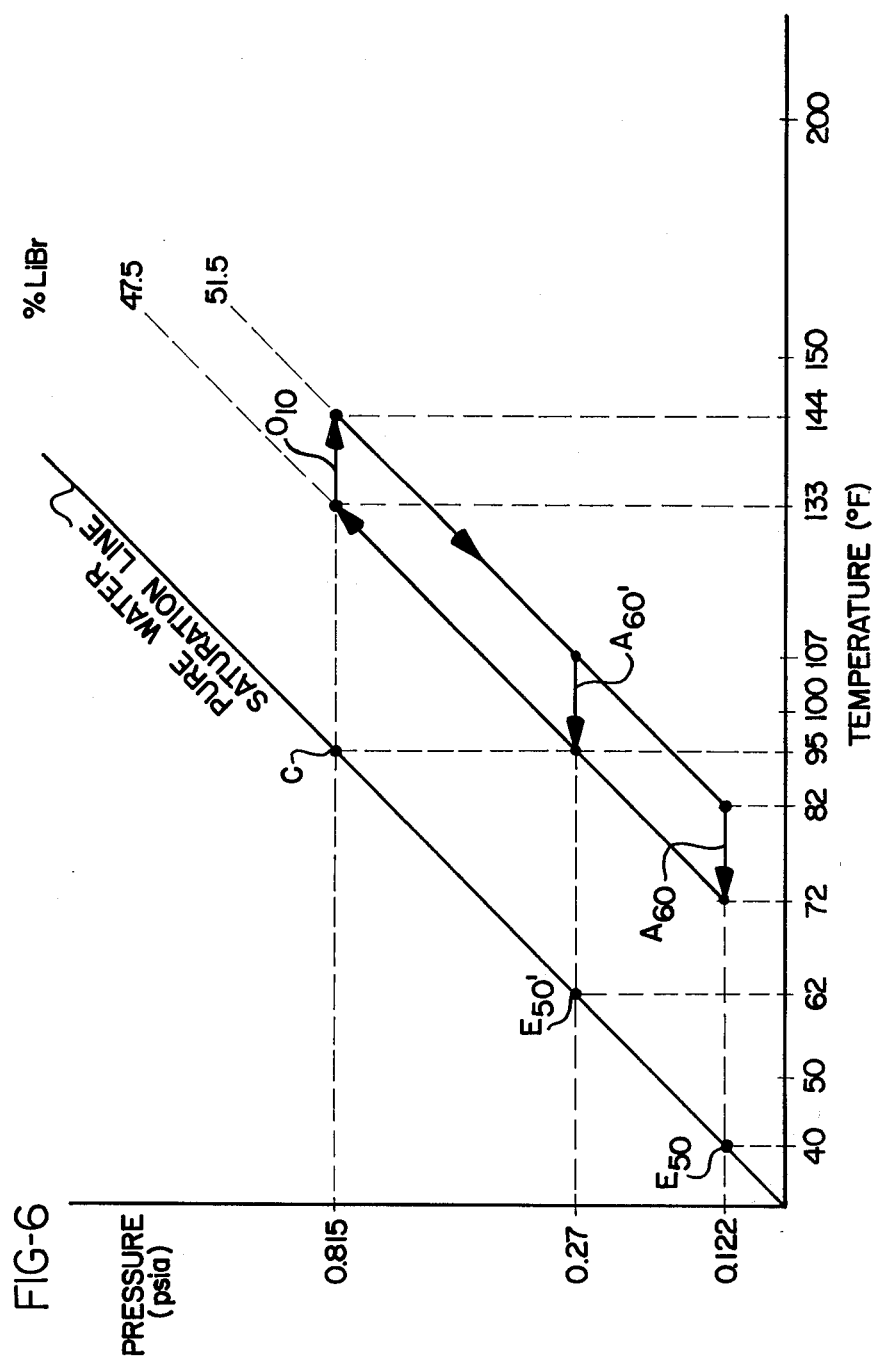
FIG. 6 is a pressure-temperature-concentration diagram of the system illustrated in FIG. 5.

To illustrate the operation of the system of FIG. 5, and with reference to the pressure-temperature-concentration diagram of FIG. 6, heat from a waste heat source entering at 169° F. is supplied to desorber 10 ($D_{10}$) operating at 144° F. and 0.815 psia. This heat causes some refrigerant in solution to desorb as vapor and pass to condenser 20 (C) operating at 95° F. and 0.815 psia. The condensed vapor is then sent to evaporator 50 ($E_{50}$) generating saturated vapor at 40° F. at 0.122 psia and evaporator 50' ($E_{50'}$) generating saturated vapor at 62° F. and 0.29 psia.

The saturated vapor from evaporator 50 enters absorber 60 ($A_{60}$) where it is contacted with an initially lean in refrigerant working solution having 51.5% LiBr concentration at 82° F. The rich in refrigerant solution leaves absorber 60 with about a 47.5% LiBr concentration at 72° F., having been cooled by the chilled heat exchange fluid circulating in conduit 64. The rich solution at 47.5% LiBr concentration is heated from 72° F. to about 105° F. in heat exchanger 70. Saturated vapor from evaporator 50' enters absorber 60' and is contacted with another portion of the working solution which is initially at 51.5% LiBr concentration and about 107° F. The rich in refrigerant solution leaves absorber 60' with about a 47.5% LiBr concentration at 95° F., having rejected heat to an available ambient sink, is combined with the rich solution leaving heat exchanger 70, and is then sent to desorber 10 through heat exchanger 80 where the combined solution now is heated from 105° F. to about 130° F. The lean solution leaving desorber 10 at about 144° F. is at a 51.5% LiBr concentration and is divided and recycled back to absorbers 60 and 60', respectively.

Figure 7:
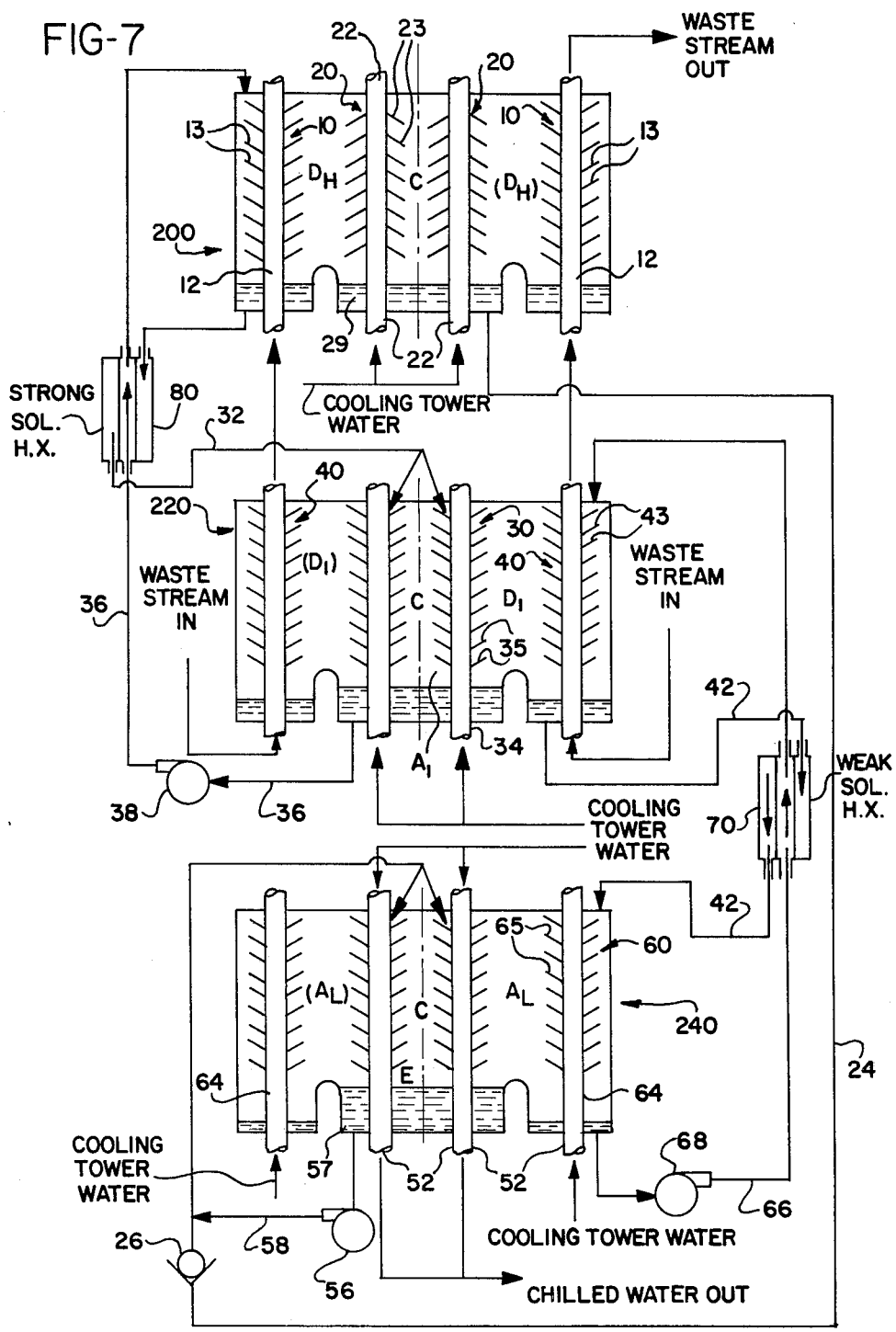
FIG. 7 is a schematic illustration of countercurrent flow equipment incorporated into the absorption refrigeration system of the present invention.

In a preferred embodiment of the invention, the absorption cycle refrigeration systems described above may incorporate the countercurrent flow heat and mass transfer devices disclosed in commonly assigned copending application Ser. No. (177,695), filed Aug. 13, 1980, the disclosure of which is hereby incorporated by reference. As shown in FIG. 7 with like reference numerals representing like components, the system described above in FIG. 1, is modified to be contained in three pressurized housings or cylindrical drums 200, 220, and 240, respectively. Located in housing 200, which is maintained at a relatively high pressure with respect to the other system components, are at least one desorber 10 and at least one condenser 20. Desorber 10 includes a generally vertically oriented hollow conduit 12 and a plurality of cup-like fins 13 attached along the length of its outer surface.

These cup-like fins are designed to catch and temporarily hold the working solution supplied by line 36. The fins serve not only to increase the residence time of the working solution in the housing, but also provide large mass transfer surface areas for refrigerant to be desorbed from solution. The configuration of the cup-like fins shown in FIG. 7 is intended to be typically descriptive and other arrangements may be utilized. For example, perforations such as holes or notches may be utilized in the fins to improve the distribution of solution over the outer surface as fluid flows from cup to cup. Continuous helical fins, cup-shaped to improve the containment of solution, can also be used. The advantageous countercurrent arrangement occurs by flowing the waste heat stream into the lower opening of conduit 12 so that the warmer entering waste heat temperature coincides with the warmer, temperature of the solution leaving the bottom fins.

Condenser 20 also comprises a generally vertically oriented hollow conduit 22 having a plurality of cup-like fins 23 attached along the length of its outer surface. However, in this instance, the fins are inverted to provide condensation surfaces for refrigerant vapor which then drips off of the fins and is collected in sump 29. Multiple desorber and condenser components can be utilized such as by locating the desorbers around the outer periphery of the housing with the condensers positioned nearer the center of the housing. In some situations it may be peferable to locate the condenser section around the periphery and locate the desorber section in the central section. This alternative is anticipated as within the context of this invention as convenience of plumbing connections and external thermal insulation may dictate the configuration choice.

Located in housing 220, which is maintained at an intermediate pressure, are at least one desorber 40 and one absorber 30. Desorber 30 is of similar construction to desorber 10 and has a generally vertically oriented hollow conduit 12 having a plurality of cup-like fins 43 attached along the length of the outer surface thereof. Absorber 30 also comprises a generally vertically oriented hollow conduit 34 having a plurality of cup-like fins 35 arranged along its outer surface similar to the arrangement in the desorber. Multiple desorber and absorber components can also be disposed within housing 220. The countercurrent flow exists in the absorber by locating the entering cooling fluid stream into the lower end of conduit 34 so that the cooler cooling fluid entering the absorber conduit coincides with the cooler solution leaving the absorber.

Housing 240, which is maintained at a relatively low pressure with respect to the other system components contains at least one evaporator 50 and at least one absorber 60. As above, the evaporator and absorber comprise generally vertically oriented hollow conduits 52 and 64 having cup-like fins 53 and 65, respectively, arranged along their lengths. As before, a multiplicity of absorber and evaporator components may be disposed within housing 240.

All of the remaining piping, system components, and fluid connections are the same as for the system described in FIG. 1 above. Heat from an available waste heat stream is supplied via conduit 12 to desorbers 40 and 10. Refrigerant vapor desorbed from the working solution in desorber 10 is condensed on fins 23 of condenser 20, collected in sump 29, and sent to evaporator 50. There, heat is drawn from the fluid in conduit 52 to evaporate refrigerant and provide a chilled fluid output. A recirculation loop comprising a pump 56, sump 57, and recirculation line 58 is provided for returning liquid refrigerant to evaporator 50.

The refrigerant vapor migrates over to absorber 60 where it is absorbed into the working solution contained in cup-like fins 65. Cooling water, circulating in conduit 64, removes the heat generated in absorber 60. Working solution leaving absorber 60 is pumped by pump 68 through recuperative heat exchanger 70 to desorber 40.

In desorber 40, heat from the waste heat stream supplied through the fluid in conduit 12 causes at least a portion of the refrigerant to desorb as vapor and migrate to absorber 30. The remaining solution in desorber 40 is collected and returned via line 42 to absorber 60. In absorber 30, the refrigerant vapor is absorbed, collected, and recycled via line 36 and pump 38 through heat exchanger 80 to desorber 10.

Figure 8:
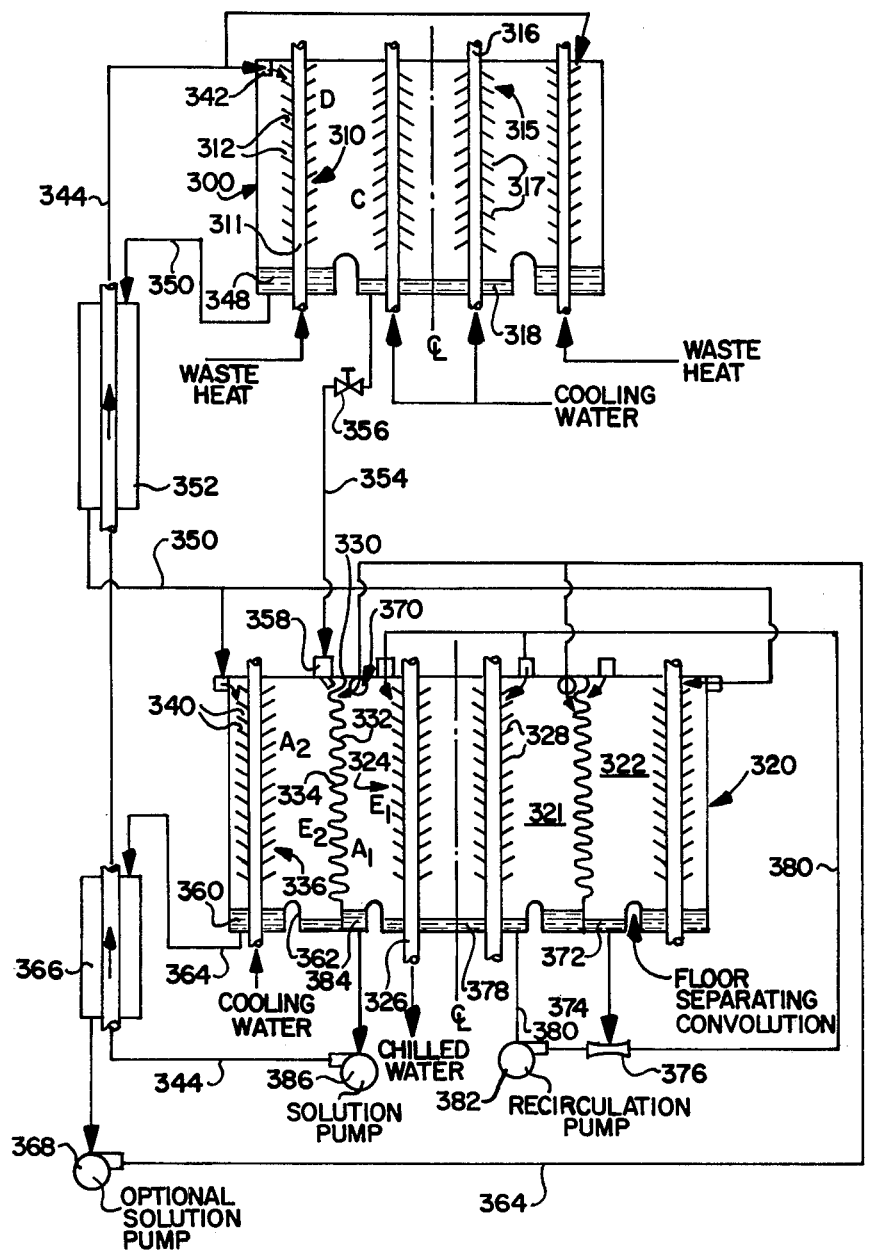
FIG. 8 is a schematic illustration of a modified cascade absorption refrigeration system using countercurrent flow equipment.

The use of countercurrent flow equipment in other absorption cycle refrigeration systems can lead to significant improvements in heat recovery which make it feasible to drive such systems with heat from sensible waste heat sources. For example, in the cascade system disclosed by Bearint, U.S. Pat. No. 3,483,710, the desorber may be divided into two or more separate sections and fed with a waste heat stream in sequence. This utilizes a much greater proportion of the heat available in such a waste heat stream than would the disclosed system which is conventionally driven by a high grade, high temperature heat source. The desorber of this invention represents a virtually infinite subdivision of the desorber placed in our shell and, as such, allows maximized utilization of the sensible waste heat stream. As illustrated in FIG. 8, the modified cascade absorption refrigeration system of the present invention comprises two pressurized housings or cylindrical drums 300 and 320. Housing 300, which is maintained at a relatively high pressure with respect to drum 320, contains at least one desorber 310 and at least one condenser 315. Desorber 310 includes a generally vertically oriented hollow conduit 311 and a plurality of cup-like fins 312 attached along the length of its outer surface.

Condenser 315 also comprises a generally vertically oriented hollow conduit 316 having a plurality of cup-like fins 317 attached along the length of its outer surface. However, the fins are inverted to provide condensation surfaces for refrigerant vapor which then drips off the fins and collects in sump 318. Multiple desorber and condenser components can also be utilized as described for the system of FIG. 7 above.

Housing 320 comprises an inner chamber 321 and an annular outer chamber 322. Located in chamber 321 is at least one evaporator 324 comprising a generally vertically oriented hollow conduit 326 having a plurality of cup-like fins 328 attached along the outer surface thereof. A common wall 330 divides the two chambers and, in a preferred configuration, contains convolutions running generally horizontally around the circumference of the wall. Preferably, the convolutions are designed to provide extended, relatively horizontal surfaces for a film of solution to collect on. Alternatively, the convolutions may comprise a helical configuration around the circumference of the wall. Alternatively, the interior surface of common wall 330 may comprise cup-shaped fins to hold solution as in the desorbers and absorbers of FIGS. 7 and 8.

The interior surface 332 of common wall 330 facing evaporator 324 acts as an absorber in which a working solution of refrigerant and absorbent contacts and absorbs at least a portion of the vapor generated by evaporator 324. The exterior surface 334 of common wall 330 serves as a second evaporator operating at a somewhat higher pressure than the evaporator in inner chamber 321. Alternate configurations at the outer surface of common wall 330 can include cup-like fins or projections after the manner at evaporator $E_1$. Also in outer chamber 322 is at least one absorber 336 comprising a generally vertically oriented hollow conduit 338 having a plurality of cup-like fins 340 attached along the length of its outer surface.

In operation, heat from an available waste heat source is supplied to desorber 310 via a heat exchange fluid in conduit 311. A working solution of absorbent and refrigerant is supplied to fins 312 through inlet 342 and line 344. Refrigerant vapor desorbed from the solution migrates to condenser 315 which is cooled by fluid from an ambient heat sink flowing in conduit 316. The refrigerant vapor condenses on fins 317 and collects in sump 318. A ridge 346 running about the base of housing 300 maintains the condensed refrigerant separate from the working solution. The now lean in refrigerant working solution is collected in sump 348 and is recirculated to absorber 336 through line 350 and recuperative heat exchanger 352.

Condensate from sump 318 is passed through line 354, pressure let-down valve 356, and inlet 358 to the evaporator on exterior wall surface 334. There, utilizing the heat provided by the absorber operating on the interior surface 332 of wall 330, refrigerant is evaporated and migrates to absorber 336. At absorber 336, the vapor is contacted by the working solution pooled in fins 340 where at least a portion of it is absorbed into solution. Cooling water or other fluid from an available heat sink is provided in conduit 338 to remove the heat generated by the absorption process. The rich in refrigerant solution collects in sump 360 and is maintained separated from the excess liquid refrigerant in the chamber by ridge 362 running about the base of housing 320.

The solution in sump 360 is removed via line 364 and passed through recuperative heat exchanger 366 before being pumped, by pump 368, to inlet 370 located at the top of the interior surface 332 of common wall 330. The excess liquid refrigerant collects in sump 372, is removed via line 374, and is then combined with the refrigerant in a recirculation loop via venturi 376 and taken to evaporator 324.

At evaporator 324, which is maintained at a relatively low pressure with respect to other system components, at least a portion of the liquid refrigerant is evaporated drawing heat from the fluid in conduit 326 and producing a chilled fluid output which can be used for comfort conditioning or the like. Refrigerant which is not evaporated collects in sump 378 and is recirculated through line 380 and pump 382.

Refrigerant vapor produced at evaporator 324 then migrates to the absorber operating on the interior surface 332 of common wall 330 where it is contacted with the working solution of absorbent and refrigerant being recirculated from absorber 336. The rich in refrigerant solution is collected in sump 384 and then sent through line 344 and heat exchangers 366 and 352 by solution pump 386 before being returned to desorber 310 to complete the working solution loop.

While the methods and apparatus described herein constitute preferred embodiments of the invention, it is to be understood that the invention is not limited to these precise methods and forms of apparatus, and that changes may be made in either without departing from the scope of the invention which is defined in the appended claims.

What is claimed is:

1. A process for producing refrigeration from a sensible waste heat source using a compound absorption refrigeration cycle with a refrigerant and an absorbent compatible with said refrigerant, said absorbent having a negligible volatility at the temperatures encountered during operation, comprising the steps of:
    (a) supplying heat from said waste heat source and utilizing a portion of it to desorb as relatively high pressure vapor at least a portion of said refrigerant from a first working solution of said absorbent and said refrigerant,
    (b) condensing at least a portion of the refrigerant vapor from step (a) at said relatively high pressure,
    (c) passing the resultant liquid refrigerant to an area of relatively lower pressure where at least a portion of it is expanded and evaporated, drawing heat from an external space and producing a refrigerating effect,
    (d) contacting the refrigerant vapor formed in step (c) with a second working solution of said absorbent and refrigerant to absorb at least a portion of said refrigerant vapor into solution,
    (e) passing the resultant solution to an area of intermediate pressure and supplying another portion of heat from said waste heat source from step (a) to desorb as vapor at least a portion of the refrigerant from step (d), and returning said second working solution to step (d),
    (f) contacting the refrigerant vapor from step (e) with said first working solution of said absorbent and refrigerant from step (a) to absorb at least a portion of said refrigerant vapor into solution, and
    (g) returning the resultant solution to step (a).

2. The process of claim 1 in which the temperature of said sensible waste heat source is between about 130° F. and 250° F.

3. The process of claim 1 including the step of passing the solutions from step (f) and step (g) through a countercurrent flow heat exchanger.

4. The process of claim 1 in which said refrigerant is water and said absorbent is lithium bromide.

5. The process of claim 1 including the step of passing the solutions from step (d) and step (e) through a countercurrent flow heat exchanger.

6. The process of step 1 in which said waste heat is supplied in sequence at successively lower pressures and temperatures first to step (a) and then to step (e).

7. The process of claim 1 in which said waste heat is supplied in sequence at successively lower pressures and temperatures first to step (e) and then to step (a).

8. A process for producing refrigeration from a sensible waste heat source using a compound absorption refrigeration cycle with a refrigerant and an absorbent compatible with said refrigerant, said absorbent having a negligible volatility at the temperatures encountered during operation, comprising the steps of:
    (a) supplying heat from said waste heat source and utilizing a portion of it to desorb as relatively high pressure vapor at least a portion of said refrigerant from a first working solution of said absorbent and said refrigerant,
    (b) condensing at least a portion of the refrigerant vapor from step (a) at said relatively high pressure,
    (c) passing the resultant liquid refrigerant to an area of relatively lower pressure where at least a portion of it is expanded and evaporated, drawing heat from an external space and producing a refrigerating effect,
    (d) contacting the refrigerant vapor formed in step (c) with a second working solution of said absorbent and refrigerant to absorb at least a portion of said refrigerant vapor into solution,
    (e) passing the resultant solution to an area of intermediate pressure and supplying a succeeding portion of heat from said waste heat source to desorb as vapor at least a portion of the refrigerant from step (d), and returning said second working solution to step (d),
    (f) contacting the refrigerant vapor from step (e) with a third working solution of said absorbent and refrigerant to absorb at least a portion of said refrigerant vapor into solution,
    (g) passing the resultant solution to an area having a pressure higher than that of step (e) but lower than that of step (a) and supplying a succeeding portion of heat from said waste heat source to desorb as vapor at least a portion of the refrigerant from step (d), and returning said third working solution to step (f),
    (h) contacting the refrigerant vapor from step (g) with said first working solution of said absorbent and refrigerant to absorb at least a portion of said refrigerant vapor into solution, and
    (i) returning the resultant solution to step (a).

9. The process of claim 8 in which the temperature of said sensible waste heat source is between about 130° F. and 250° F.

10. The process of claim 8 in which said refrigerant is water and said absorbent is lithium bromide.

11. A process for producing refrigeration from a sensible waste heat source using a compound absorption refrigeration cycle with a refrigerant and an absorbent compatible with said refrigerant, said absorbent having a negligible volatility at temperatures encountered during operation, comprising the steps of:
    (a) supplying heat from said waste heat source and utilizing a portion of it to desorb as relatively high pressure vapor at least a portion of said refrigerant from a working solution of said absorbent and said refrigerant,
    (b) condensing at least a portion of the refrigerant vapor from step (a) at said relatively high pressure,
    (c) passing a first portion of the resultant liquid refrigerant to an area of relatively lower pressure where at least a portion of it is expanded and evaporated, drawing heat from an external space and producing a refrigerating effect,
    (d) contacting the refrigerant vapor formed in step (c) with said working solution of said absorbent and refrigerant to absorb at least a portion of said refrigerant vapor into solution,
    (e) passing a second portion of the resultant liquid refrigerant from step (b) to an area of intermediate pressure where at least a portion of it is expanded and evaporated, (f) contacting the refrigerant vapor formed in step (e) with said working solution of said absorbent and refrigerant to absorb at least a portion of said refrigerant vapor into solution, and (g) combining the resultant solutions from steps (d) and (f) and returning them to step (a).

12. A system for producing refrigeration from a sensible waste heat source using a refrigerant and an absorbent compatible with said refrigerant, said absorbent having a negligible volatility at the temperatures encountered during operation, comprising, first means for desorbing at least a portion of said refrigerant in a first working solution of said absorbent and said refrigerant as vapor at a relatively high pressure including means for supplying heat to said first desorbing means from said source of waste heat, means for condensing at least a portion of the refrigerant vaporized by said first desorbing means, means for evaporating refrigerant at a relatively low pressure including means for supplying heat from an external space to said evaporating means, first means for contacting the refrigerant vapor produced in said evaporating means with a second working solution of said absorbent and said refrigerant to absorb at least a portion of said vapor into solution, second means for desorbing at least a portion of the refrigerant from said second working solution as vapor at an intermediate pressure including means for supplying heat to said second desorbing means from said source of waste heat, second means for contacting the refrigerant vapor produced in said second desorbing means with said first working solution to absorb at least a portion of said vapor into solution, means for connecting said first desorbing means with said condensing means and supplying the vapor produced in said first desorbing means to said condensing means at substantially the same temperature as it was produced, means for connecting said second desorbing means with said second contacting means and supplying the vapor produced in said second desorbing means to said second contacting means at substantially the same temperature as it was produced, and means connecting said condensing means with said evaporating means, said evaporating means with said first contacting means, said first contacting means with said second desorbing means, and said second contacting means with said first desorbing means.

13. The system of claim 12 including means for recycling said first working solution from said first desorbing means to said second contacting means.

14. The system of claim 12 including means for recycling said second working solution from said second desorbing means to said first contacting means.

15. The system of claim 12 in which said means for supplying heat to said second desorbing means is in fluid communication with the downstream end of said means for supplying heat to said first desorbing means.

16. A system for producing refrigeration from a sensible waste heat source using a refrigerant and an absorbent compatible with said refrigerant, said absorbent having a negligible volatility at the temperatures encountered during operation, comprising, first means for desorbing at least a portion of said refrigerant in a first working solution of said absorbent and said refrigerant as vapor at a relatively high pressure including means for supplying heat to said first desorbing means from said source of waste heat, means for condensing at least a portion of the refrigerant vaporized by said desorbing means, means for evaporating refrigerant at a relatively low pressure including means for supplying heat from an external space to said evaporating means, first means for contacting the refrigerant vapor produced in said evaporating means with a second working solution of said absorbent and said refrigerant to absorb at least a portion of said vapor into solution, second means for desorbing at least a portion of the refrigerant from said second working solution as vapor at an intermediate pressure including means for supplying heat to said second desorbing means from said source of waste heat, second means for contacting the refrigerant vapor produced in said second desorbing means with a third working solution of said absorbent and said refrigerant to absorb at least a portion of said vapor into solution, third means for desorbing at least a portion of the refrigerant from said third working solution as vapor at a pressure higher than that maintained in said second desorbing means but lower than that maintained in said first desorbing means including means for supplying heat to said third desorbing means from said source of waste heat, third means for contacting the refrigerant vapor produced in said third desorbing means with said first working solution to absorb at least a portion of said vapor into solution, means for connecting said first desorbing means with said condensing means and supplying the vapor produced in said first desorbing means to said condensing means at substantially the same temperature as it was produced, means for connecting said second desorbing means with said second contacting means and supplying the vapor produced in said second desorbing means to said second contacting means at substantially the same temperature as it was produced, means for connecting said third desorbing means with said third contacting means and supplying the vapor produced in said third desorbing means to said third contacting means at substantially the same temperature as it was produced, and means connecting said condensing means with said evaporating means, said evaporating means with said first contacting means, said first contacting means with said second desorbing means, said second contacting means with said third desorbing means, and said third contacting means with said first desorbing means.

17. The system of claim 16 including means for recycling said first working solution from said first desorbing means to said third contacting means.

18. The system of claim 16 including means for recycling said second working solution from said second desorbing means to said first contacting means.

19. The system of claim 16 including means for recycling said third working solution from said third desorbing means to said second contacting means.

20. The system of claim 16 in which said means for supplying heat to said third desorbing means is in fluid communication with the downstream end of said means for supplying heat to said first desorbing means and said means for supplying heat to said second desorbing means is in fluid communication with the downstream end of said means for supplying heat to said third desorbing means.

21. A system for producing refrigeration from a sensible waste heat source using a refrigerant and an absorbent compatible with said refrigerant comprising, means for desorbing at least a portion of said refrigerant in a working solution of said absorbent and said refrigerant as vapor at a relatively high pressure including means for supplying heat to said desorbing means from said source of waste heat, means for condensing at least a portion of the refrigerant vaporized by said desorbing means, first means for evaporating refrigerant at a relatively low pressure including means for supplying heat from an external space to said first evaporating means, first means for contacting the refrigerant vapor produced in said first evaporating means with said working solution to absorb at least a portion of said vapor into solution, second means for evaporating refrigerant at an intermediate pressure, second means for contacting the refrigerant vapor produced in said second evaporating means with said working solution to absorb at least a portion of said vapor into solution, and conduit means for connecting said desorbing means with said condensing means, said condensing means with said first and second evaporating means, said first evaporating means with said first contacting means, said second evaporating means with said second contacting means, and said first and second contacting means with said desorbing means.

22. The system of claim 21 in which said first contacting means and said second evaporating means are in heat exchange relationship.

23. The system of claim 21 including means for recycling said working solution from said desorbing means to said first and second contacting means.

24. Waste heat driven absorption cycle refrigeration apparatus comprising, in combination,
a first pressurized housing having at least one countercurrent flow desorber and at least one countercurrent flow condenser, said at least one desorber comprising a vertically oriented conduit for transporting a sensible waste heat stream having a plurality of cup-like fins attached to said conduit for collecting portions of a first working solution of an absorbent and a refrigerant, said at least one condenser comprising a vertically oriented conduit for transporting a heat exchange fluid having a plurality of inverted cup-like fins attached to said conduit for providing surfaces for refrigerant vapor to condense, an inlet for supplying a first working solution to said at least one desorber, a first outlet for removing said first working solution from said first housing, and a second outlet for removing condensed refrigerant from said housing,
a second pressurized housing having at least one countercurrent flow desorber and at least one countercurrent flow absorber, said at least one desorber comprising a vertically oriented conduit for transporting a sensible waste heat stream having a plurality of cup-like fins attached to said conduit for collecting portions of a second working solution of an absorbent and a refrigerant, said at least one absorber comprising a vertically oriented conduit for transporting a heat exchange fluid having a plurality of cup-like fins attached to said conduit for providing contacting surfaces for refrigerant vapor to be absorbed into said first working solution, a first inlet for supplying said first working solution to said at least one absorber, a second inlet for supplying said second working solution to said at least one desorber, a first outlet for removing said first working solution from said second pressurized housing, and a second outlet for removing said second working solution from said second pressurized housing,
a third pressurized housing having at least one countercurrent flow absorber and at least one countercurrent flow evaporator, said at least one absorber comprising a vertically oriented conduit for transporting a heat exchange fluid having a plurality of cup-like fins attached to said conduit for providing contacting surfaces for refrigerant vapor to be absorbed into said second working solution, said at least one evaporator comprising a vertically oriented conduit for transporting a heat exchange fluid having a plurality of cup-like fins attached to said conduit for providing collecting pools for liquid refrigerant to be evaporated, a first inlet for supplying liquid refrigerant to said at least one evaporator, a second inlet for supplying said second working solution to said at least one absorber, a first outlet for removing refrigerated heat exchange fluid from said third pressurized housing, and a second outlet for removing said second working solution from said third pressurized housing.

25. Waste heat driven absorption cycle refrigeration apparatus comprising, in combination,
a first pressurized housing having at least one countercurrent flow desorber and at least one countercurrent flow condenser, said at least one desorber comprising a vertically oriented conduit for transporting a sensible waste heat stream having a plurality of cup-like fins attached to said conduit for collecting portions of a working solution of an absorbent and a refrigerant, said at least one condenser comprising a vertically oriented conduit for transporting a heat exchange fluid having a plurality of inverted cup-like fins attached to said conduit for providing surfaces for refrigerant vapor to condense, an inlet for supplying said working solution to said at least one desorber, a first outlet for removing said working solution from said first housing, and a second outlet for removing condensed refrigerant from said housing,
a second pressurized housing having an inner chamber and an annular outer chamber around said inner chamber sharing a common wall, said inner chamber including at least one countercurrent flow evaporator comprising a vertically oriented conduit for transporting a heat exchange fluid having a plurality of cup-like fins attached to said conduit for providing collecting pools of liquid refrigerant to be evaporated, inlet means for supplying liquid refrigerant to said evaporator, means adjacent the interior surface of the common wall of said inner chamber for supplying said working solution along said interior surface, said interior surface acting as an absorber for refrigerant vapor, means for collecting working solution leaving said interior surface, said outer chamber including an exterior surface of said common wall being in heat exchange contact with said interior surface and acting as an evaporator for liquid refrigerant, inlet means for supplying liquid refrigerant to said exterior surface of said common wall, at least one countercurrent flow absorber comprising a vertically oriented conduit for transporting a heat exchange fluid having a plurality of cup-like fins attached to said conduit for providing contacting surfaces for refrigerant vapor to be absorbed, inlet means for supplying said working solution to said absorber, and outlet means for collecting and removing said working solution.

* * * * *